(12) United States Patent
Ajami et al.

(10) Patent No.: US 12,428,997 B2
(45) Date of Patent: Sep. 30, 2025

(54) MULTI-MODE STARTER CONTROL FOR GAS TURBINE ENGINES

(71) Applicant: RTX CORPORATION, Farmington, CT (US)

(72) Inventors: Andre M. Ajami, Henderson, NV (US); Donny Davis, West Palm Beach, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/419,936

(22) Filed: Jan. 23, 2024

(65) Prior Publication Data

US 2025/0237173 A1    Jul. 24, 2025

(51) Int. Cl.
| F02C 7/26 | (2006.01) |
| F01D 25/36 | (2006.01) |
| F02C 7/268 | (2006.01) |
| F02C 7/275 | (2006.01) |

(52) U.S. Cl.
CPC ............ F02C 7/26 (2013.01); F01D 25/36 (2013.01); F02C 7/268 (2013.01); F02C 7/275 (2013.01); F05D 2220/50 (2013.01); F05D 2260/85 (2013.01)

(58) Field of Classification Search
CPC .. F02C 7/26; F02C 7/268; F02C 7/275; F01D 25/36; F05D 2220/50; F05D 2260/85
See application file for complete search history.

(56) References Cited

U.S. PATENT DOCUMENTS

| 3,170,450 | A | 2/1965 | Kent et al. |
| 4,315,422 | A | 2/1982 | Cordner |
| 4,702,273 | A | 10/1987 | Allen et al. |
| 4,736,726 | A | 4/1988 | Matsuno et al. |
| 5,107,674 | A | 4/1992 | Wibbelsman et al. |
| 5,237,815 | A | 8/1993 | McArthur |
| 5,667,051 | A | 9/1997 | Goldberg et al. |
| 5,722,228 | A | 3/1998 | Lampe et al. |
| 6,960,900 | B2 | 11/2005 | Fogarty et al. |
| 7,216,489 | B2 | 5/2007 | Uluyol et al. |
| 7,250,688 | B2 | 7/2007 | Thomson et al. |
| 8,666,633 | B2 | 3/2014 | Ertz |

(Continued)

FOREIGN PATENT DOCUMENTS

| EP | 0623741 | 11/1994 |
| EP | 3318726 | 5/2018 |
| FR | 3044703 | 6/2017 |

OTHER PUBLICATIONS

Extended European Search Report for European Patent Application No. 18213214.2 completed May 17, 2019.
European Search Report for European Patent Application No. 19159818.4 completed Jul. 3, 2019.

(Continued)

*Primary Examiner* — Gerald L Sung
*Assistant Examiner* — Rene D Ford
(74) *Attorney, Agent, or Firm* — Carlson, Gaskey & Olds, P.C.

(57) ABSTRACT

A starter assembly for a gas turbine engine may include, among other things, at least one electric motor coupled to a respective spool. A controller may be operable to modulate the at least one electric motor in a plurality of control modes. The control modes may include a torque control mode, an acceleration control mode and/or a speed control mode. A method for starting a gas turbine engine is also disclosed.

17 Claims, 8 Drawing Sheets

(56) References Cited

U.S. PATENT DOCUMENTS

| | | | |
|---|---|---|---|
| 8,808,142 | B2 | 8/2014 | Al-Khairy |
| 9,464,589 | B2 | 10/2016 | Grumer et al. |
| 11,015,535 | B2 | 5/2021 | Ajami et al. |
| 11,174,793 | B2 | 11/2021 | Ajami et al. |
| 11,183,956 | B2 | 11/2021 | Kheraluwala et al. |
| 2007/0051111 | A1 | 3/2007 | Uluyol et al. |
| 2008/0276620 | A1* | 11/2008 | Ullyott .............. F01D 21/06 60/773 |
| 2011/0259016 | A1* | 10/2011 | Winston ............. F02C 7/26 60/778 |
| 2014/0095051 | A1 | 4/2014 | Lamarre |
| 2015/0211421 | A1 | 7/2015 | Harriet et al. |
| 2016/0065106 | A1 | 3/2016 | Venter |
| 2016/0305329 | A1 | 10/2016 | Saito |
| 2017/0016398 | A1 | 1/2017 | Thiriet et al. |
| 2023/0045973 | A1 | 2/2023 | Morgan et al. |

OTHER PUBLICATIONS

Trinkel, B. (2006). Chapter 4: ISO symbols. Hydraulics & Pneumatics. Retrieved from: https://www.hydraulicspneumatics.com/other-technologies/chapter-4-iso-symbols.

Technical Information. Solenoid valve types. Retrieved Aug. 21, 2018 from: https://tameson.com/solenoid-valve-types.html.

Gonzalez, C. (2017). What's the difference between hydraulic circuit symbols? MachineDesign. Retrieved Aug. 21, 2018 from: https://www.machinedesign.com/motion-control/what-s-difference-between-hydraulic-circuit-symbols.

European Search Report for European Patent Application No. 19198154.7 completed Jan. 24, 2020.

Website. What is the Difference Between Speed Versus Torque? Power Electric. Retrieved from: https://www.powerelectric.com/motor-resources/motors101/speed-vs-torque.

European Search Report for European Patent Application No. 25153660.3 mailed Jun. 23, 2025.

\* cited by examiner

MULTI-MODE STARTER CONTROL FOR GAS TURBINE ENGINES

BACKGROUND

This disclosure relates to gas turbine engines, and more particularly to operating a gas turbine engine during various operating conditions including start-up.

Gas turbine engines typically include a compressor section and a turbine section. The air is compressed in the compressor section. From the compressor section the air is introduced into a combustor section where it is mixed with fuel and ignited in a combustor. Products of this combustion pass downstream over a turbine section to extract energy for driving the compressor section. Gas turbine engines can be utilized to provide propulsion and/or auxiliary power to an aircraft and components thereof.

Gas turbine engines can utilize starters to provide motive power prior to engine light-off. An "engine light-off" event occurs when combustion in the combustor has commenced and the turbine section begins to provide torque without complete assistance of a starter. The starter may generate maximum torque during engine start-up.

SUMMARY

A starter assembly for a gas turbine engine may include, among other things, at least one electric motor coupled to a respective spool. A controller may be operable to modulate the at least one electric motor in a plurality of control modes. The control modes may include a torque control mode in which the controller may be operable to set a torque output of the at least one electric motor to oppose an increase in speed of the respective spool and/or an acceleration control mode in which the controller may be operable to cause the at least one electric motor to substantially maintain acceleration of the respective spool at a preselected acceleration rate such that the respective spool may substantially achieve a target speed threshold within a preselected duration.

In any implementations, the controller may be operable to adjust a torque and/or a speed of the at least one electric motor to transition between the control modes.

In any implementations, the plurality of control modes may include a speed control mode in which the controller may be operable to cause the at least one electric motor to substantially maintain a speed of the respective spool at a preselected holding speed.

In any implementations, the controller may be operable to cause the at least one electric motor to operate in the acceleration control mode and then in the speed control mode prior to occurrence of an engine light-off condition.

In any implementations, the preselected holding speed may be substantially equal to the target speed threshold for at least one iteration of the speed control mode and the acceleration control mode.

In any implementations, the controller may be operable to cause the at least one electric motor to operate in the torque control mode subsequent to occurrence of an engine light-off condition until at least one predetermined criterion is met.

In any implementations, the at least one predetermined criterion may include a minimum temperature threshold of a combustor.

In any implementations, the controller may be operable to cause the at least one electric motor to maintain torque output above a preselected torque threshold in the torque control mode such that the at least one electric motor may oppose rotation of the respective spool until a gas turbine engine component reaches a preselected operating threshold.

In any implementations, the controller may be operable to cause the at least one electric motor to operate in the torque control mode in response to determining an occurrence of an engine light-off condition.

In any implementations, the at least one spool may be a portion of an auxiliary power unit.

In any implementations, the at least one spool may be a portion of a gas turbine engine including a propulsor having a plurality of blades that produce thrust for propulsion.

In any implementations, the at least one spool may include a plurality of spools. The at least one electric motor may include a plurality of electric motors coupled to the respective spools. The controller may be operable to independently control the electric motors in the respective plurality of control modes.

A gas turbine engine assembly may include, among other things, at least one spool including a turbine coupled to a compressor or a propulsor. A starter assembly may include at least one electric motor operable to drive the respective spool during an engine startup condition and may include a controller operable to modulate the at least one electric motor in a plurality of control modes. The control modes may include an acceleration control mode in which the at least one electric motor may be operable to substantially maintain acceleration of the respective spool at a preselected acceleration rate until a first predetermined criterion is met. The control modes may include a speed control mode in which the at least one electric motor may be operable to substantially maintain a speed of the respective spool at a preselected holding speed.

In any implementations, the gas turbine engine assembly may include an auxiliary power unit. The auxiliary power unit may include the spool.

In any implementations, the plurality of control modes may include a torque control mode in which the at least one electric motor may be operable to oppose a change in speed of the respective spool until a second predetermined criterion is met.

In any implementations, the controller may be operable to cause the at least one electric motor to operate in the acceleration control mode and the speed control mode prior to an engine light-off condition. The controller may be operable to cause the at least one electric motor to operate in the torque control mode subsequent to the engine light-off condition, but prior to a power generator control mode in which the respective spool may drive the at least one motor to generate an amount of electricity.

In any implementations, the gas turbine engine assembly may include a combustor. The second predetermined criterion may include a minimum temperature threshold of the combustor associated with an engine idle condition.

A method for starting a gas turbine engine may include, among other things, operating a starter assembly in an acceleration control mode, including driving at least one spool of the gas turbine engine with a respective electric motor of the starter assembly such that rotation of the respective spool may reach and then may be substantially maintained at a preselected acceleration rate to substantially achieve a target speed threshold within a preselected duration. The method may include operating the starter assembly in a torque control mode in which the respective electric motor may oppose a change in rotational speed of the respective spool until a preselected engine operating threshold is met.

In any implementations, the method may include operating the starter assembly in a speed control mode in which the respective electric motor may substantially maintain the rotational speed of the respective spool at a preselected holding speed.

In any implementations, an instance of operating the starter assembly in the acceleration control mode may occur prior to an occurrence of an engine light-off condition. An instance of operating the starter assembly in the torque control mode may occur after the occurrence of the engine light-off condition but prior to an occurrence of an engine idle condition.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1:
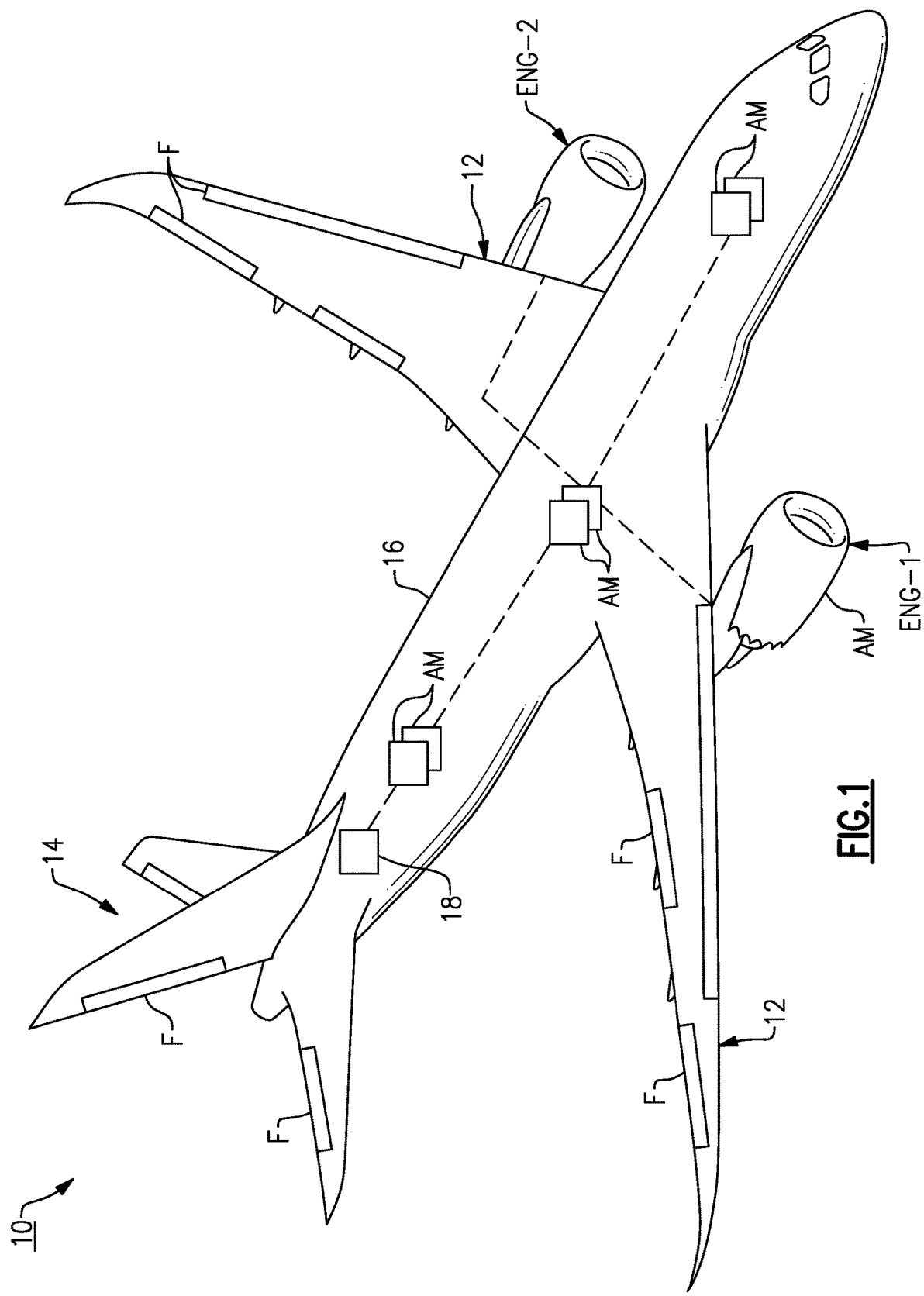
FIG. 1 discloses an aircraft according to an implementation.

FIG. 1 discloses a vehicle or aircraft 10 according to an implementation. The aircraft 10 may include a pair of wings 12 and a tail section 14 that extend from a body or fuselage 16. The aircraft 10 may include mechanical loads such as pivotable flaps F.

The aircraft 10 may include vehicle system(s) or aircraft module(s) AM distributed at various discrete positions of the aircraft 10. The aircraft modules AM may communicate with, or may otherwise be coupled to, one another. The aircraft modules AM may include hardware and/or software to provide functionality to operate and control the aircraft 10.

The aircraft modules AM may include avionics systems, cockpit, visualization and display systems, communications and navigation systems, input/output (I/O) modules to interconnect with other systems and modules of the aircraft 10, engine and fuel systems, electrical and auxiliary power systems, environment control systems (ECS), fire protection systems, galley control systems, lighting systems, water and waste systems, landing gear systems, diagnostics systems, and other known systems. The aircraft modules AM may include one or more engines including a propulsor for providing propulsion (e.g., thrust), such as a pair of engines ENG-1, ENG-2 attached to the wings 12. Though illustrated as being coupled to the wings 12, this is not intended to be so limiting, and the engines ENG-1 and ENG-2 may be attached to other parts of the aircraft 10, such as the fuselage, empennage, and/or the like.

Figure 2:
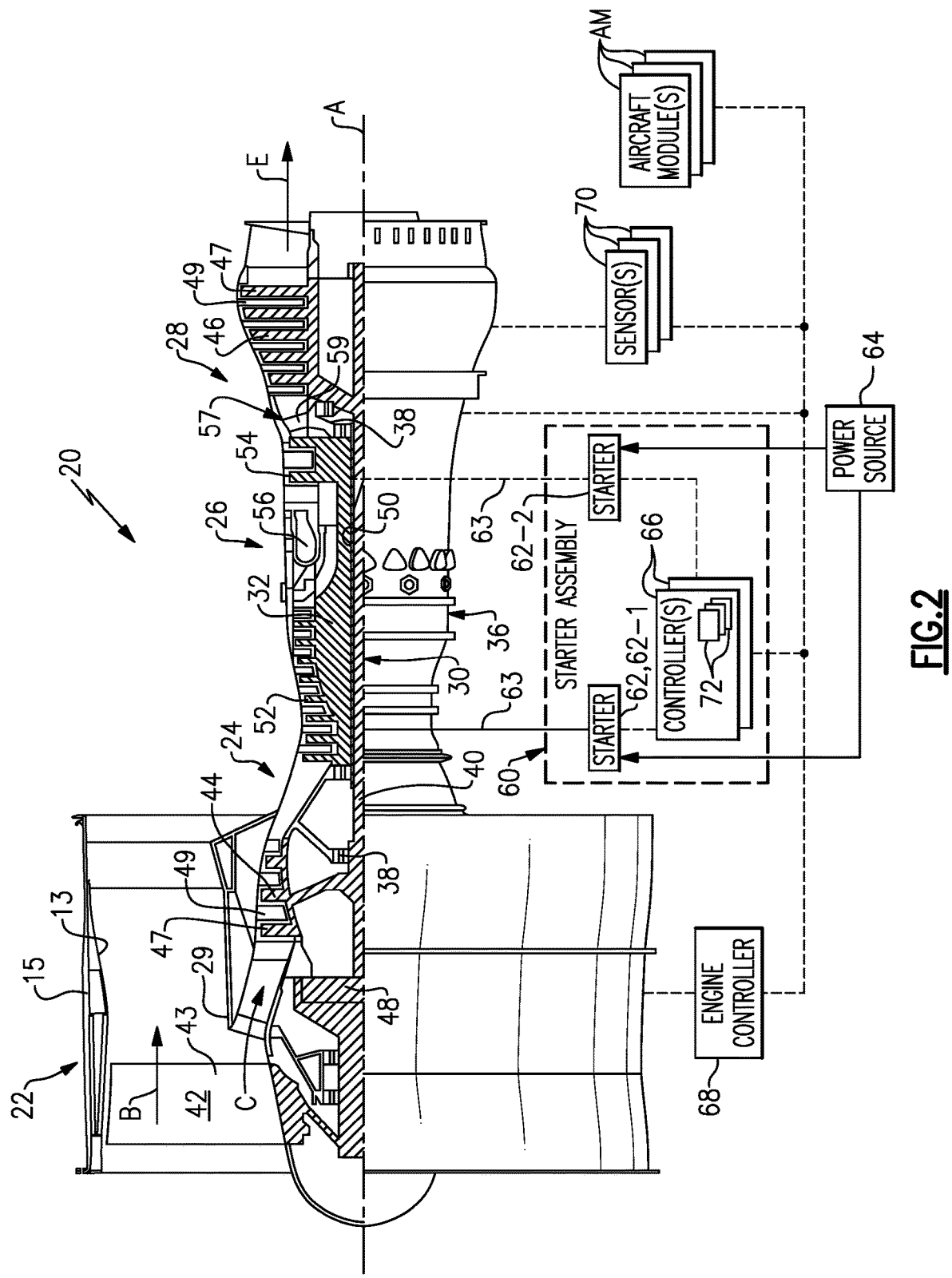
FIG. 2 discloses an implementation of a gas turbine engine assembly.

The aircraft modules AM may communicate with a power source 18 such as an auxiliary power unit (APU) which may provide an on-board source of auxiliary electrical power to other aircraft modules AM including engine(s) such as engine 20 (FIG. 2). The APU may include a gas turbine engine, such as engine 120 (FIG. 3), that may drive an electrical generator and/or gearbox. Although the teachings herein primarily refer to an aircraft, such as a fixed wing or rotary aircraft, other vehicle systems may benefit from the teachings disclosed herein, including other aerospace systems such as space vehicles and satellites, ground-based vehicles and power generation systems, and marine systems.

FIG. 2 discloses a gas turbine engine assembly including a gas turbine engine 20 according to an implementation. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram° R)/(518.7° R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

A starter assembly 60 may be utilized to assist in operation of the aircraft 10 and/or engine 20, including engine startup and/or power generation. The starter assembly 60 may be coupled to at least one spool. The spool may be a portion of a gas turbine engine, such as an engine 120 of an auxiliary power unit (APU) 118 operable to provide power to one or more aircraft modules AM (e.g., FIG. 3). The gas turbine engine may include a propulsor having a plurality of blades that produce thrust for propulsion, such as the engine 20.

In the implementation of FIG. 2, the engine 20 may be coupled to the starter assembly 60. The starter assembly 60 may be operable to selectively drive at least one, or both, of the shafts 40, 50 and/or another portion of the spools 30, 32 during engine startup. In implementations, only one of the spools 30, 32 is coupled to a single starter 62, such as the low speed spool 30.

The starter assembly 60 may include one or more starters 62. Each starter 62 may be mechanically coupled to a respective one of the spools 30, 32. The starter 62 may be operable to drive the respective spool 30/32 during various operating conditions of the engine 20, such as engine startup. In implementations, a towershaft 63 may interconnect the starter 62 and the respective spool 30/32. Various starters may be utilized in accordance with the techniques disclosed herein, including mechanical, electrical and/or fluid actuated starters. In implementations, the starter 62 may be a rotary motor such as an electric motor. The motor may be operable to convert mechanical energy to electrical energy, or vice versa. The electric motor may be operable to generate various amounts of torque, speed and/or power at an output (e.g., shaft).

Each starter 62 may be coupled to power source(s) 64. The power source 64 may be operable to provide input power to the starter 62. Various power sources may be utilized, such as a ground power unit.

The starter assembly 60 include multiple control modes for operating the starter(s) 62 to facilitate engine startup. The starter assembly 60 may include one or more (e.g., starter) controllers 66 coupled to the starter(s) 62. Each controller 66 may be operable to control one or more starters 62. The controller 66 may be operable to modulate or otherwise control the starter(s) 62 in one or more control modes 72 to facilitate operation of various aircraft modules AM, such as the engine 20. In implementations, the controller(s) 62 may be operable to independently modulate or otherwise control two or more starters 62 during engine operation. The present control modes 72 of the starters 62 may be the same or may differ during engine operation, including engine startup.

Each starter 62 may be associated with a respective performance curve. The controller 66 may be programmed to access and operate the starter 62 according to the respective performance curve. The performance curve may be incorporated as one or more lookup tables or equations stored in memory. The controller 66 may be programmed to modulate or otherwise control the starter 62 according to the respective performance curve. In implementations, the controller 66 may set a voltage and/or phase of the control signal(s) to an electrical motor of the starter 62 to achieve one or more outputs associated with the performance curve, including instantaneous speed, torque and/or power.

The controller 66 may be an analog and/or digital device. The controller 66 may include one or more processors, memory devices and/or interfaces. The processor may be any type of known microprocessor having desired performance characteristics. The memory device may include UVPROM, EEPROM, FLASH, RAM, ROM, DVD, CD, a hard drive, or other computer readable medium which may store data and the method for starting or otherwise operating the disclosed starter assemblies of this description. The interface may be operable to facilitate communication with other systems or components of the engine or aircraft, such as over one or more communications (e.g., data) buses. The controller 66 may be incorporated into a portion of an engine controller 68, such as a full authority digital engine control (FADEC) or electronic engine control (EEC), another system, or vice versa, or may be a stand-alone system. In implementations, the controller 66 and engine controller 68 may be operable to communicate information utilizing digital and/or analog signals, including any of the information disclosed herein.

The controller 66 may be operable to modulate or otherwise command the respective starter(s) 62 during various operating conditions, such as engine startup. The controller 66 may be coupled to the engine 20 and/or other aircraft modules AM to communicate data, signals and/or other information. The controller 66 may be coupled to one or more sensors 70 that may be operable to measure one or more (e.g., operating) conditions of the engine 20, aircraft 10 and/or portions thereof. Example conditions may include engine parameters such as a rotational speed (N) of the respective spools 30, 32 (e.g., N1, N2), an exhaust gas temperature (EGT) of exhaust gases E exiting the engine 20 and/or a temperature of the combustor 56. Other conditions may include ambient temperature, velocity and/or altitude of the aircraft 10.

Figure 3:
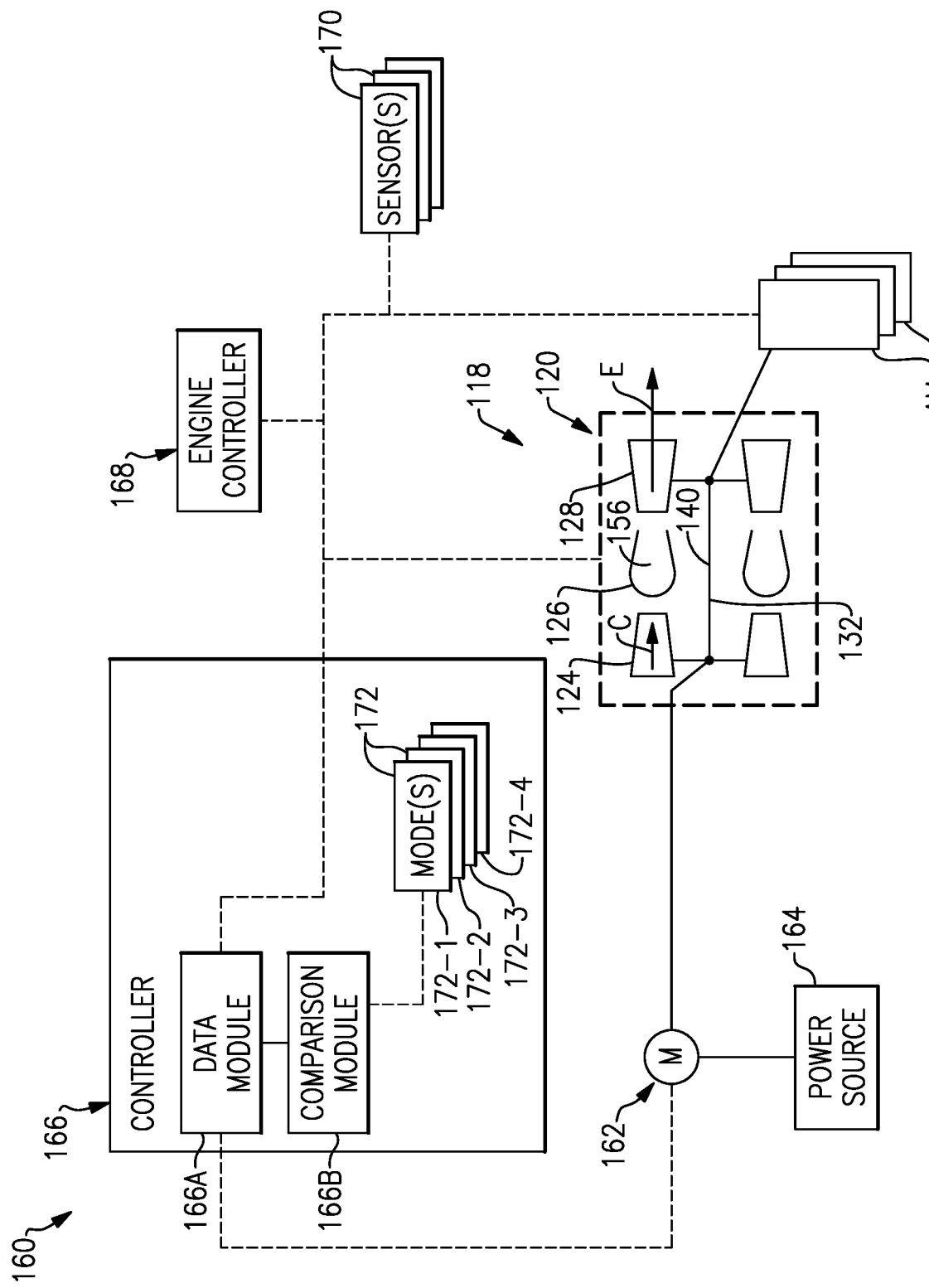
FIG. 3 discloses another implementation of a gas turbine engine assembly.

FIG. 3 discloses a starter assembly 160 for a gas turbine engine according to another implementation. In this disclosure, like reference numerals designate like elements where appropriate and reference numerals with the addition of one-hundred or multiples thereof designate modified elements that are understood to incorporate the same features and benefits of the corresponding original elements. A gas turbine engine 120 may include at least one spool 132 defined by a compressor section 124 including at least one compressor and a turbine section 128 including at least one turbine. The engine 120 may include a combustor section 126 including a combustor 156 in fluid communication with the compressor and turbine sections 124, 128.

The starter assembly 160 may include at least one starter 162 mechanically coupled to a shaft 140 of the spool 132. The starter assembly 160 may be operable to rotate or otherwise move shaft 140 during various operating conditions, such as engine startup. The starter 162 may include any of the starters disclosed herein, such as an electric motor. The starter 162 may be coupled to a power source 164.

The spool 132 may be a portion of an APU. In the implementation of FIG. 3, the engine 120 may be an APU that may serve as a power source 118 to supply power to one or more aircraft modules AM. The engine 120 may be operable to supply auxiliary power to the engine 20 and/or one or more other aircraft modules AM during operation of the aircraft 10 (FIGS. 1-2). Although the teachings herein primarily refer to an APU having a single spool gas turbine engine, other engine architectures may benefit from the teachings herein, including multi-spool architectures. The starter assembly 160 may be utilized to drive other systems such as the engine packages ENG-1, ENG-2 (FIG. 1).

A (e.g., starter) controller 166 may be operable to modulate or otherwise control a speed, torque and/or power output of the starter 162. The starter 162 may be infinitely variable across a range of speed, torque and/or power output to drive the shaft 140 and/or another portion of the spool 132 in response to one or more commands from the controller 166. The controller 166 may be programmed or otherwise configured to select the setting along the respective performance curve based on various control commands, including any of the control commands disclosed herein such as a target speed and/or acceleration rate of the associated spool. One would understand how to program the controller 166 with logic or otherwise configure the controller 166 to control the starter 162 according to any of the techniques disclosed herein. The controller 166 may be a standalone device, or the functionality of the controller 166 may be incorporated into an engine controller 168 associated with the engine 120.

The controller 166 may include various modules to provide the disclosed functionality. In implementations, the controller 166 may include a data (e.g. interface) module 166A and a comparison module 166B operable to communicate with each other. The controller 166 may be programmed to execute the data module 166A and comparison module 166B as one or more software instructions. The data module 166A may be coupled to an engine controller 168, one or more sensors 170, aircraft modules AM and/or engine 120.

Each sensor 170 may be operable to detect (e.g., sense) one or more conditions of the engine 120 and/or aircraft 10, including any of the conditions disclosed herein. Each sensor 170 may be operable to detect one or more conditions of a static or rotatable gas turbine engine component, such as a present rotational speed of one or more rotatable components of the engine 120. The gas turbine engine component may be a rotatable shaft, such as the shaft 140 or one of shafts 40, 50 (FIG. 2). The sensors 170 may be operable to detect a present temperature and/or pressure of gasses in core flow path C and/or an exhaust stream E communicated from or otherwise exiting turbine section 128 of the engine 120. The "present" rotational speed or temperature corresponds to a signal sensed within a timeframe that accounts for signal propagation between the various components including the controller 166 and respective sensor(s) 170.

The data module 166A may be operable to communicate with one or more subsystems of the engine 120 and/or other aircraft modules AM of an aircraft associated with the engine 120. In implementations, the data module 166A may be operable to communicate with the engine controller 168.

The data module 166A may be operable to access the data or other information during one or more conditions or events associated with component(s) of the engine 120, such as engine startup event prior to, during and subsequent to occurrence of engine light-off. For the purposes of this disclosure, an "engine startup event" means a condition in which the engine is moved from rest at least until occurrence of engine light-off.

The comparison module 166B may be operable to determine an engine light-off condition (e.g., event) and/or other engine operational condition(s) of a gas turbine engine, such as one of engines 20, 120. Various techniques for determining an occurrence of an engine light-off condition are known, but utilizing the techniques disclosed herein based on determining engine light-off are not known. Techniques for determining an engine light-off event may include evaluating a present rotation speed of a spool, an instantaneous change or rise in acceleration rate (Ndot) of the spool, and/or a rise in present EGT of the exhaust gases E. One would understand how to program the controller 166 to determine an occurrence of an engine light-off event in view of the teachings disclosed herein.

The controller 166 may be operable to modulate a starter, such as the starter 162, in one or more control modes 172. The control modes 172 may be associated with a respective gas turbine engine, such as the engine 120. The control modes 172 may be established with respect to the operating characteristics of the associated engine, such as maximum thrust rating, temperatures, pressures, rotational speeds, etc. One would understand how to program the controller 166 with logic to control the starter 162 to operate in any of the control modes 172 disclosed herein. The controller 66 may incorporate any of the features of the controller 166 disclosed herein. The starter 62/162 may be operable at a range of torque/speed/power settings between a minimum torque/speed/power output and a maximum torque/speed/power output. The controller 66/166 may be operable to cause the starter 62/162 to operate at the minimum torque/speed/power output, the maximum torque/speed/power output and/or any intermediate torque/speed/power output to cause the starter 62/162 to operate in the control modes 72/172. The control modes may be useful in achieving a preselected operating condition of the respective spool (e.g., speed, acceleration rate, etc.), and the controller may be programmed or otherwise configured to achieve the preselected operating condition.

In the implementation of FIG. 2, the starter assembly 60 may be coupled to at least one spool of engine 20. The spool may include a turbine coupled to a compressor and/or a propulsor of the engine 20, such as the turbine 46/54, compressor 44/52 and/or propulsor (e.g., fan) 42. The engine 20 may include more than one spool, such as the spools 30, 32. The starter assembly 60 may include starters 62 coupled to the respective spools 30, 32, such as first and second starters 62-1, 62-2. The controller(s) 66 may be operable to independently control the starters 62-1, 62-2 in the respective control modes 72. The controller(s) 66 may be operable to operate the starters 62-1, 62-2 in the same or different control modes 72. In implementations, the starter 62-2 may enter into one of the control modes 72 subsequent to the starter 62-1 entering into the same control mode 72. In other implementations, the controller(s) 66 are operable to cause the starters 62-1, 62-2 to operate concurrently in the same control mode(s) 72. The control modes 72 associated with the respective starters 62-1, 62-2 may be associated with different parameters based on the operating characteristics of the respective spool 30, 32, including different torque, speed and/or power profiles, durations, thresholds, predetermined criterion, etc.

Referring again to FIG. 3, various control modes 172 may be established. The control modes 172 may include a first (e.g., acceleration) control mode 172-1, a second (e.g., speed) control mode 172-2 and/or a third (e.g., torque) control mode 172-3. It should be understood that fewer or more than three control modes may be established, including any of the control modes disclosed herein. The control modes 172 may be associated with an engine start condition, including the control modes 172-1 to 172-3.

In implementations, the starter 162 may be a starter/generator. The control modes 172 may include a fourth (e.g., power generator) control mode 172-4. In the power generator control mode 172-4, the starter/generator 162 may be driven by the spool 132, another portion of the engine 120 and/or another source to generate an amount of electricity for consumption by one or more aircraft modules (e.g., components) AM. The respective spool 132 may drive the starter 162 to generate an amount of electricity during various engine and flight conditions. The controller 166 may be operable to command the starter/generator 162 to operate in the generator control mode 172-4 subsequent to the engine start condition, including an engine idle condition and various other operating conditions of the engine 120 in which the engine 120 may generate sufficient power to drive the starter/generator 162.

The controller 166 may be operable to adjust or otherwise set the speed and/or torque output of the starter 162 in response to sensed and/or estimated conditions of the speed and/or torque output, which may establish a feedback loop. Other conditions providing feedback may include current supplied to the starter 162, which may depend on loading. One would understand how to determine a present speed and/or torque output of the starter 162.

Figure 4:
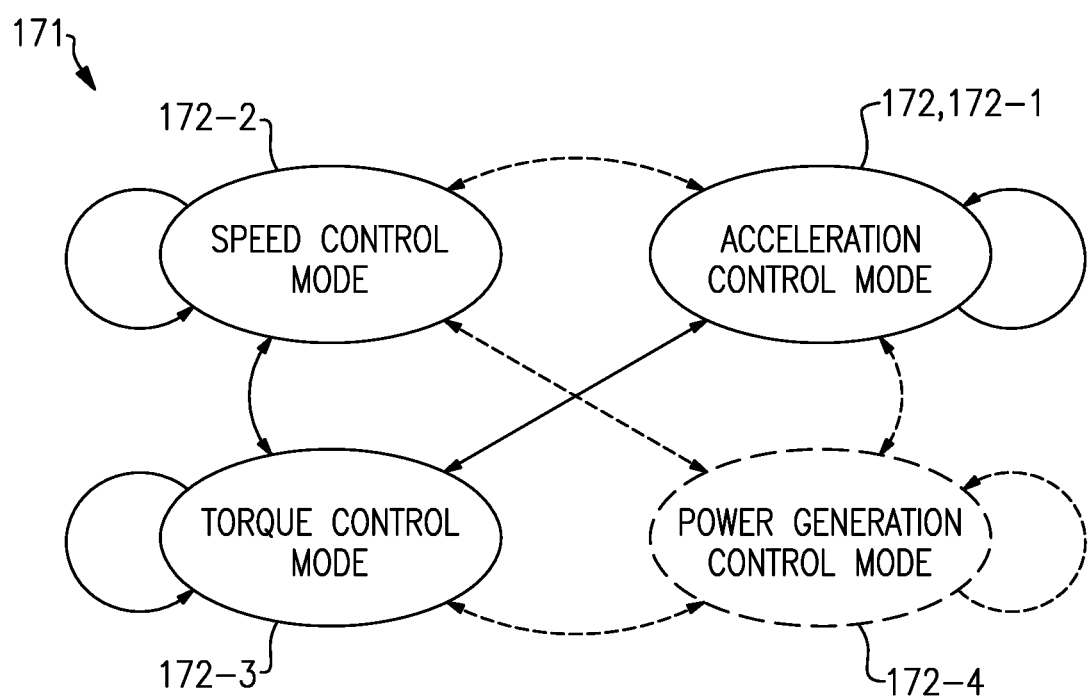
FIG. 4 discloses a state transition diagram associated with operation of a gas turbine engine assembly according to an implementation.

FIG. 4 discloses a state transition diagram 171 associated with the control modes 172 according to an implementation. The controller 166 may be operable to transition and/or hold the starter 162 in any of the control modes 172. The controller 166 may be operable to adjust a torque, speed and/or power output of the starter 162 to transition between the control modes 172. The controller 166 may be operable to adjust and/or substantially maintain a torque, speed and/or power output of the starter 162 in the control modes 172. For the purposes of this disclosure, the terms "substantially," "about" and "approximately" mean±10 percent of the stated value or relationship unless otherwise indicated. The controller 166 may be operable to cause the starter 162 to operate in at least one, only one, and/or two or more (e.g., three) of the control modes 172 prior to occurrence of an engine light-off event, including any of the control modes disclosed herein. In implementations, the controller 166 may be operable to cause the starter 162 to operate in the acceleration control mode 172-1, but not the speed control mode 172-2 and/or torque control mode 172-3, prior to occurrence of an engine light-off event. In implementations, the controller 166 may be operable to cause the starter 162 to operate in the acceleration control mode 172-1 and then in the speed control mode 172-2 prior to occurrence of an engine light-off event, or vice versa, which may improve a likelihood of a successful engine light-off event.

The controller 166 may be operable to cause the starter 162 to operate for at least one iteration in the acceleration control mode 172-1 and/or at least one iteration the speed control mode 172-2 prior to an engine light-off event associated with the engine 120. The controller 166 may be operable to cause the starter 162 to operate in the torque control mode 172-3 subsequent to the engine light-off event, but prior to the power generator control mode 172-4. In implementations, the controller 166 may be operable to cause the starter 162 to operate in the power generator control mode 172-4 during and/or subsequent to an engine idle condition associated with the engine 120.

The controller 166 may be operable to modulate or otherwise control the starter 162 in the acceleration control mode 172-1. The acceleration control mode 172-1 may be useful in causing the spool 132 to substantially achieve and/or maintain a preselected acceleration rate. In scenarios, various Mach Number conditions may cause a slower or faster engine start, which may cause the fuel control system of the engine to operate at extreme delivery limits. The acceleration control mode 172-1 may be utilized to normalize engine start-up for a more consistent start time that may be tailored for various operating and/or environment conditions, including relatively sensitive combustion points during acceleration.

In the acceleration control mode 172-1, the starter 162 may be operable to substantially maintain acceleration of the respective spool 132 at a preselected acceleration rate until at least one (e.g., a first) predetermined criterion is met. The predetermined criterion may include any of the criterion disclosed herein, such as one or more sensed, inferred and/or simulated engine and/or aircraft operating conditions such as rotational speed (N) of the respective spool(s), exhaust gas temperature (EGT) of exhaust gases exiting the engine and/or combustor exit temperature (CET). Other conditions may include ambient temperature, velocity and/or altitude of the aircraft. In implementations, the predetermined criterion may include a target speed threshold and/or a preselected duration. In implementations, the controller 166 may be operable to cause the starter 162 to substantially maintain acceleration of the respective spool 132 at the preselected acceleration rate such that the spool 132 may substantially achieve the target speed threshold within the preselected duration.

The controller 166 may be operable to receive one or more acceleration rate commands during engine operation, which may be generated by the engine controller 168. In implementations, the acceleration rate command may include a variable non-zero value associated with a preselected (e.g., target) acceleration rate of the spool. The acceleration rate command may include a variable non-zero value associated with a preselected (e.g., next target) speed of the spool 132.

The controller 166 may be operable to modulate or otherwise control the starter 162 in the speed control mode 172-2. The speed control mode 172-2 may be useful in achieving and holding a (e.g., rotational) speed of the spool 132 at a preselected holding (e.g., target) speed, which may ensure a successful combustion and/or engine light-off event. In implementations, the starter 162 may be operable to substantially maintain a present speed of the spool 132 at the preselected holding speed. The controller 166 may be operable to cause the starter 162 to substantially maintain the speed of the respective spool 132 at the preselected holding speed. The preselected holding speed may be substantially equal to the target speed threshold associated with the acceleration control mode 172-1 for at least one combined iteration of the speed control mode 172-2 and the acceleration control mode 172-1.

The controller 166 may be operable to receive one or more speed target commands during engine operation, which may be generated by the engine controller 168. In implementations, the speed target command may be a variable non-zero value associated with a target (e.g., rotational) speed of the spool 132. The speed target command may include an acceleration rate value of zero such that the controller 166 may be operable to cause the starter 162 to substantially hold the speed of the spool 132 at the target speed.

The controller 166 may be operable to modulate or otherwise control the starter 162 in the torque control mode 172-3. The torque control mode may be useful in controlling a speed of the spool leading up to and/or during engine light-off and/or other speeds during starting and acceleration. The controller 166 may be operable to set a torque output of the starter 162 to assist the spool 132 in reaching an operational state. In implementations, the controller 166 may be operable to set (e.g., increase) a torque output of the starter 162 to oppose a change (e.g., increase) in speed of the respective spool 132. The controller 166 may be operable to cause the starter 162 to increase torque from approximately 0 percent torque to approximately 100 percent torque, or any intermediate value sufficient to oppose the change in speed of the respective spool 132. The controller 166 may be operable to cause the starter 162 to operate in the torque control mode 172-3 in response to determining an occurrence of an engine light-off condition. The controller 166 may be operable to cause the starter 162 to operate in the torque control mode 172-3 subsequent to occurrence of the engine light-off condition until at least one predetermined criterion is met, including any of the criterion disclosed herein. In implementations, the torque output of the starter 162 may be less than the torque output of the spool 132 to provide an amount of braking during startup. The controller 162 may cause the starter 162 to provide a negative torque output to the spool to provide an amount of breaking.

The starter controller 166 may be operable to receive one or more torque commands during engine operation, which may be generated by the engine controller 168. In implementations, the torque command may be a variable non-zero value associated with a torque setting in a range of minimum and maximum torque output of the starter 162 (e.g., 0-100 percent). The starter 162 may be operable to oppose a change in a present (e.g., rotational) speed of the respective spool 132 until at least one (e.g., a second) predetermined criterion is met. The predetermined criterion may include any of the predetermined criterion disclosed herein, such as one or more sensed, inferred and/or simulated engine and/or aircraft operating conditions such as rotational speed (N) of the respective spool(s), exhaust gas temperature (EGT) of exhaust gases exiting the engine and/or combustor exit temperature (CET). Other conditions may include ambient temperature, velocity and/or altitude of the aircraft. In implementations, the second predetermined criterion may include a minimum temperature threshold of the combustor 156 associated with an engine idle condition. The minimum temperature threshold may be a temperature sufficient for successful combustion in the engine idle condition and may improve longevity of various gas turbine engine components. Successful combustion may be defined with respect to minimum fuel burn and emissions levels for a particular engine and/or aircraft.

The controller 166 may be operable to cause the starter 162 to maintain torque output above a preselected torque threshold in the torque control mode 172-3 such that the starter 162 may oppose rotation of the respective spool 132 at least until one or more gas turbine engine components of the engine 120 reach a preselected operating threshold, such as the combustor 156.

The starter 162 may be operable to prevent or otherwise oppose entry of the engine 120 into an engine idle condition until the predetermined criterion is met. The predetermined criterion may include any of the predetermined criterion disclosed herein, such as one or more sensed, inferred and/or simulated engine and/or aircraft operating conditions such as rotational speed (N) of the respective spool(s), exhaust gas temperature (EGT) of exhaust gases exiting the engine and/or combustor exit temperature (CET). Other conditions may include ambient temperature, velocity and/or altitude of the aircraft. In implementations, the predetermined criterion may include a minimum temperature threshold of the combustor 156. The controller 166 may be operable to compare a present temperature of the combustor 156, such as a combustor exit temperature (CET), to the minimum temperature threshold. Utilizing the techniques disclosed herein, the controller 166 may operate the starter 162 in a manner that may facilitate conditioning (e.g., warming up) various components of the combustor 156 and associated systems, such as combustor panels, fuel, etc., prior to the end of engine startup, which may be particularly beneficial in relatively cold environmental conditions.

Figure 5:
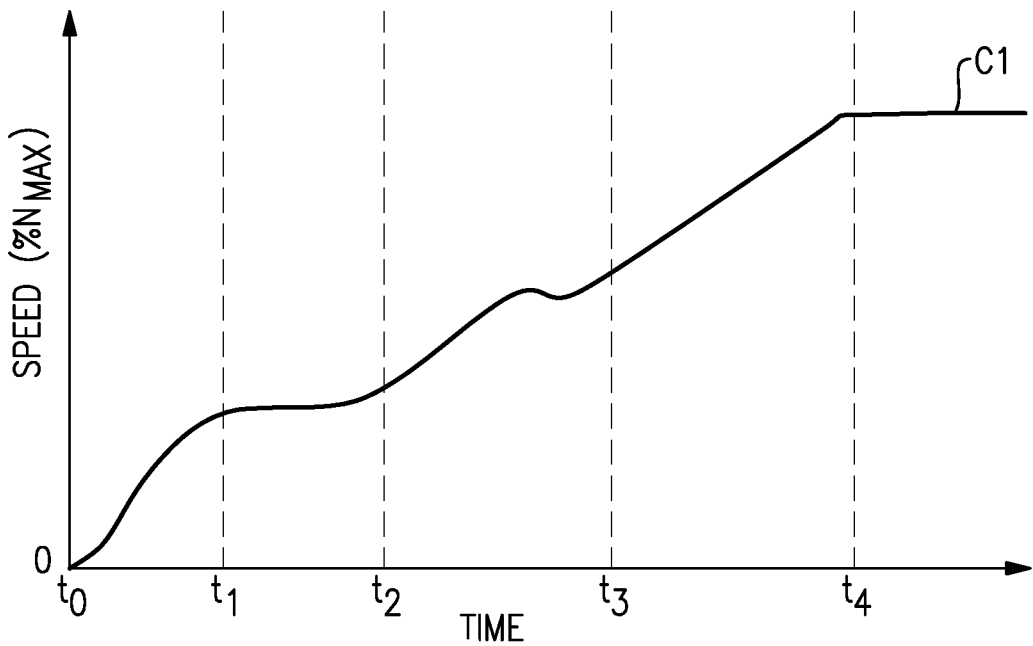
FIG. 5 discloses a plot of a curve associated with a speed of a component of a gas turbine engine assembly according to an implementation.

FIG. 5 discloses a curve C1 associated with an engine startup scenario according to an implementation. Curve C1 may correspond to operation of a starter, such as the starter 162, in one or more of the control modes 172. Curve C1 corresponds to operation of the starter over time with respect to a speed N of a spool, such as the spool 132. In implementations, the speed N may be expressed as a percent of the maximum speed $N_{MAX}$ of the spool.

The starter 162 may be operable in one or more control modes associated a set of operating times, such as time=$t_0$, time=$t_1$, time=$t_2$, time=$t_3$ and/or time=$t_4$. The operating times may be associated with engine startup and operation. Time=$t_0$ may be associated with the engine 120 at rest. The starter 162 may accelerate from rest to drive the spool 132. Time=$t_1$ may occur prior to an engine light-off event. Time=$t_2$ may correspond to occurrence of an engine light-off event. In implementations, a preselected engine light-off period of the engine 120 may be defined between approximately 5% and 10% of Nmax. Time=$t_3$ may occur subsequent to the engine light-off event. Time=$t_4$ may be associated with commencement of an engine idle condition. It should be understood that the starter 162 may be operable in a plurality of modes over a different set of times in accordance with the techniques disclosed herein.

Figure 6:
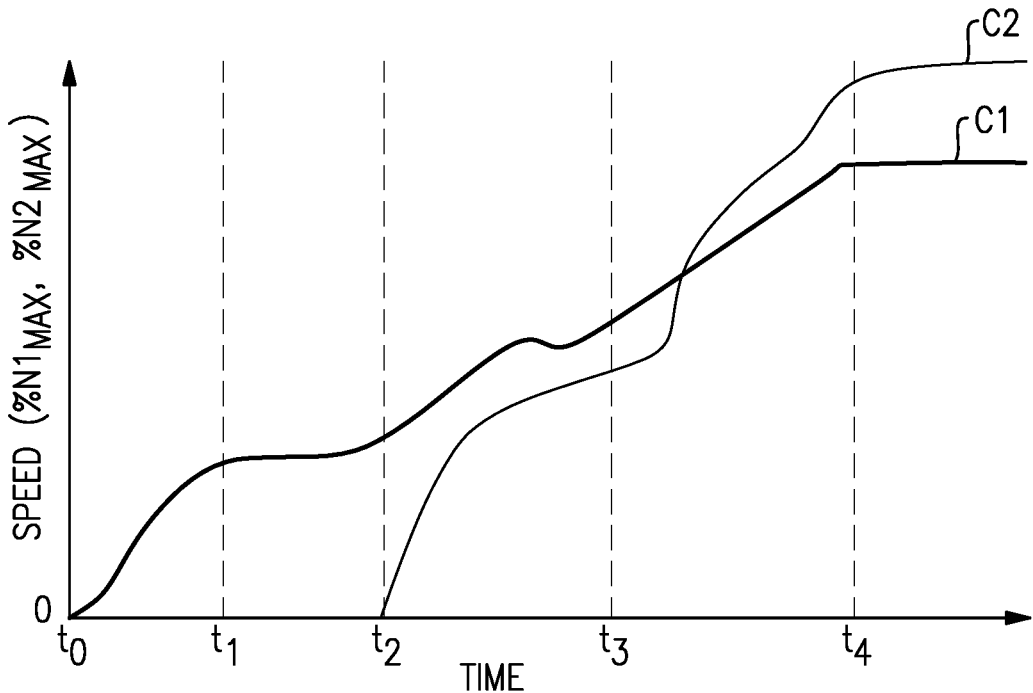
FIG. 6 discloses a plot of curves associated with speeds of components of a gas turbine engine assembly according to an implementation.

FIG. 6 discloses curves C1, C2 associated with an engine startup scenario according to another implementation. Curves C1, C2 may correspond to operation of a set of starters, such as the starters 62-1, 62-2, in one or more of the control modes 72. The curves C1, C2 may correspond to operation of the starters over time with respect to speeds N1, N2 of the respective spools. The curve C1 may have the same profile as the curve C1 of FIG. 5, but the profile may differ. Curve C1 may be associated with the speed N1 of a first (e.g., low speed) spool. Curve C2 may be associated with the speed N2 of a second (e.g., high speed) spool. In implementations, the speeds N1, N2 may be expressed as a percent of the maximum speeds $N1_{MAX}$, $N2_{MAX}$ of the respective spools. In implementations, the curve C1 may be associated with the low speed spool 30, and the curve C2 may be associated with the high speed spool 32, or vice versa (see, e.g., FIG. 2). The curves C1, C2 may be associated with the starters 62-1, 62-2 (see FIG. 2). In implementations, the speed of the spool associated with the curve C2 may trail, prior to surpassing, the speed of the spool associated with the curve C1 for a period of time during engine startup. The controller 66 may cause the fan 42 and/or low speed spool 30 to reach an operational state prior to, during or subsequent to the high speed spool 32 reaching an operational state.

Figure 7:
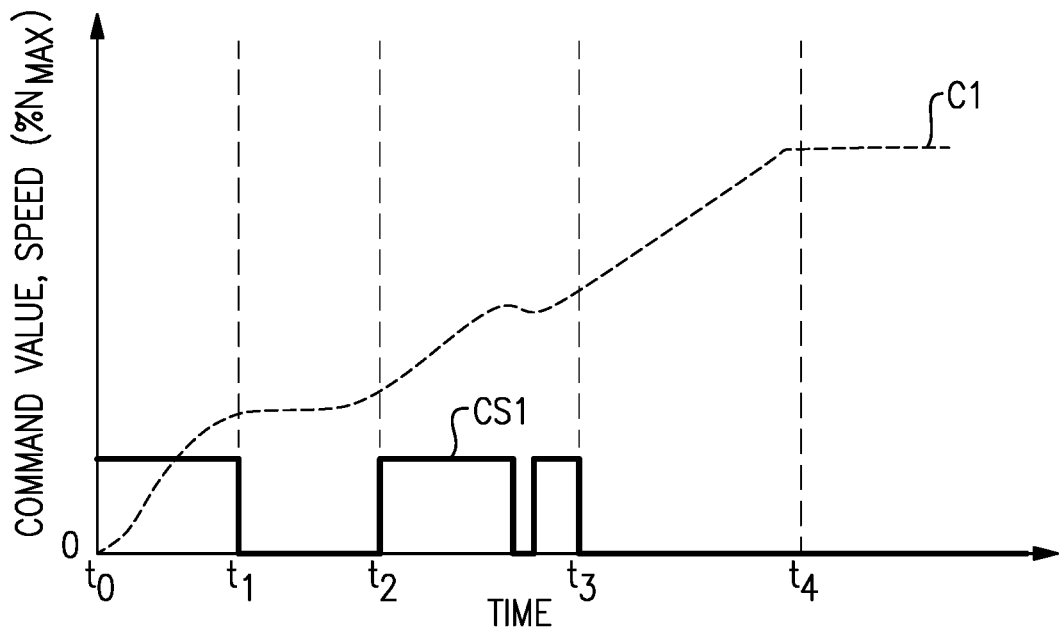
FIG. 7 discloses a plot of the curve of FIG. 5 relative to a first command signal associated with control of the gas turbine engine assembly.
Figure 8:
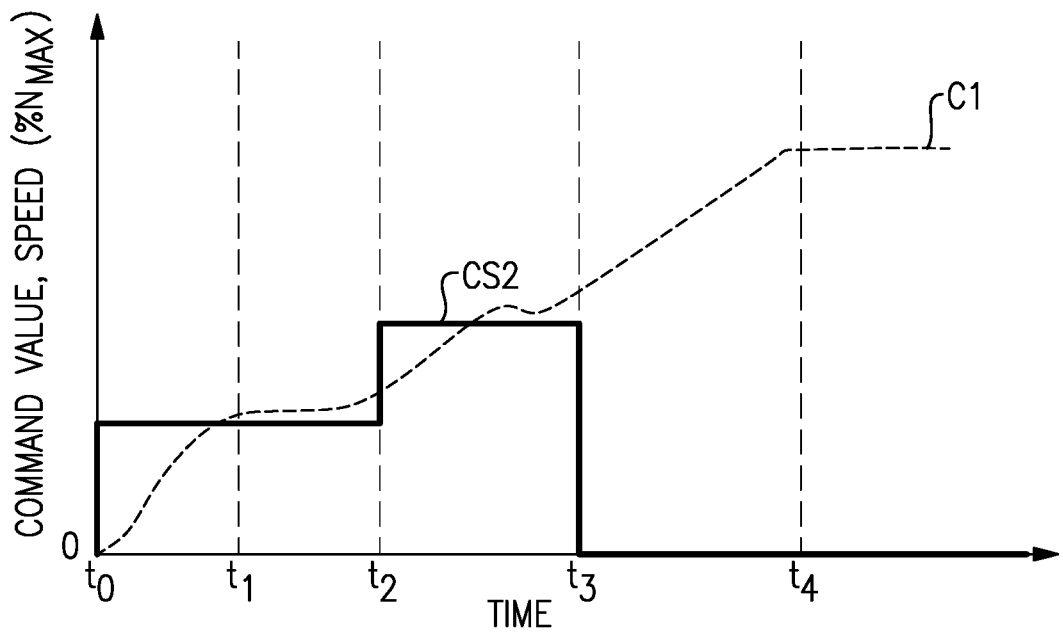
FIG. 8 discloses another plot of the curve of FIG. 5 relative to a second command signal associated with control of the gas turbine engine assembly.
Figure 9:
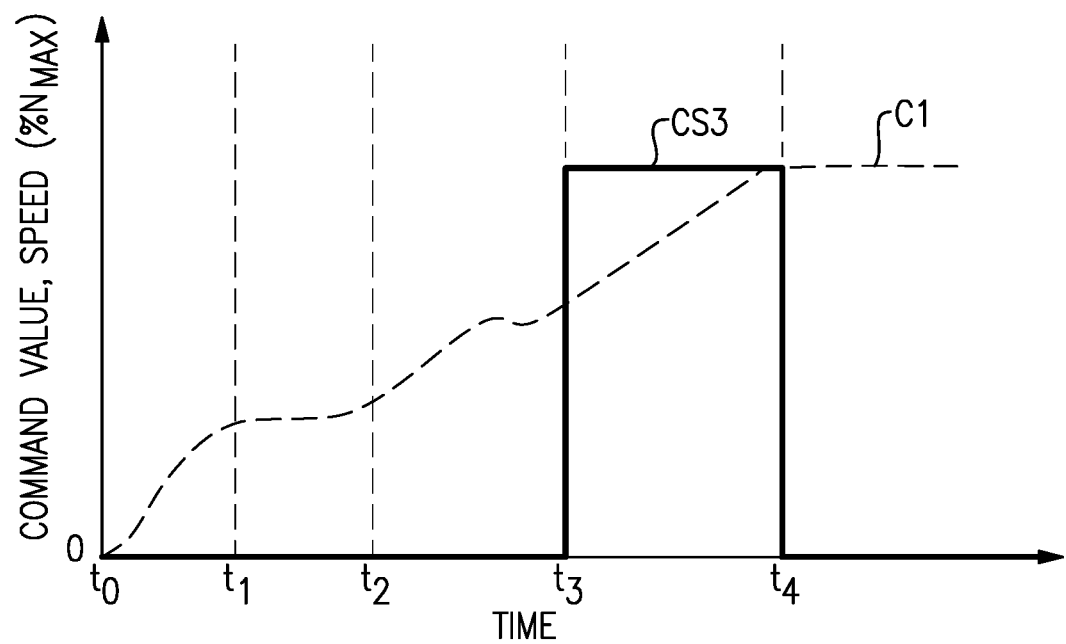
FIG. 9 discloses yet another plot of the curve of FIG. 5 relative to a third command signal associated with control of the gas turbine engine assembly.

FIGS. 6-8 disclose a set of command signals CS1, CS2, CS3 with respect to the curve C1. The command signals CS1, CS2, CS3 may be associated with one or more command values over time. The command signals CS1, CS2, CS3 may be one or more analog and/or digital signals that may convey data and/or other information useful for controlling operation of a starter, such as the starters 62, 162. The (e.g., first) command signal CS1 may be associated with a first (e.g., acceleration rate) command. The (e.g., second) command signal CS2 may be associated with a second (e.g., speed target) command. The (e.g., third) command signal CS3 may be associated with a third (e.g., torque) command. The command signals CS1, CS2, CS3 may be established utilizing any of the techniques disclosed herein. The command signals CS1, CS2, CS3 may be a portion of a respective command.

In implementations, the engine controller 168 may be operable to communicate the commands and associated parameters to the starter controller 166. The engine controller 168 may be operable to generate the commands based on various sensed and/or estimated conditions of the engine 120 and/or aircraft, including any of the conditions disclosed herein. The engine controller 168 may be operable to set a speed and/or an operational state of the engine 120 (e.g., start, run, shutdown) and may control various auxiliary systems for operating the engine 120 such as fuel systems, etc.

The starter controller 166 may cause the respective starter 162 to operate in the respective control mode 172 according to the associated command and respective command signal CS1, CS2, CS3. Although the plots of the command signals CS1, CS2, CS3 indicate a value of zero for discrete periods of time, it should be understood that the controller 166 may be operable to cause the starter 162 to operate according to value(s) of the last received command at least until another command is received by the controller 166.

In the implementation of FIGS. 6-8, time=$t_0$ to $t_1$ and/or time=$t_2$ to $t_3$ may be associated with the acceleration control mode 172-1. Time=$t_1$ to $t_2$ may be associated with the speed control mode 172-2. Time=$t_3$ to $t_4$ may be associated with the torque control mode 172-3. Time=$t_4$ may be associated with commencement of the generator control mode 172-4. It should be understood, however, that the controller 166 may be operable to cause the starter 162 to operate in any of the control modes 172 during and/or subsequent to engine startup according to the teachings disclosed herein. During time=$t_0$ to $t_1$ the controller 166 may cause the starter 162 to increase torque (e.g., to a maximum torque output) to overcome an initial (e.g., resting) inertia of the respective spool 132, and may then cause the starter 162 to decrease, hold and/or increase torque output to maintain the acceleration rate of the spool 132 within the preselected (e.g., target) acceleration rate. In implementations, the preselected acceleration rate may be approximately 2 percent/second. The controller 166 may be operable to cause the starter 162 to operate in a preselected light-off period (e.g., time=$t_0$ to $t_2$) for a relatively greater amount of time to ensure a successful light-off event. During time=$t_1$ to $t_2$ the controller 166 may cause the starter 162 to substantially achieve and/or hold the speed of the spool 132 at a preselected holding (e.g., target) speed. In implementations, the preselected holding speed may be approximately 25 percent of $N_{MAX}$. The controller 166 may cause the starter 162 to hold acceleration of the spool 132 at a preselected acceleration rate, such as approximately 0 percent/second, such that the speed of the spool 132 is maintained once the preselected holding speed is reached. During time=$t_1$ to $t_2$ the controller 166 may modulate the starter 162 to vary the speed of the spool 132 at one or more acceleration rates. In implementations, the preselected acceleration rate may vary between approximately +2 percent/second. At time=$t_3$ the controller 166 may cause the starter 162 to increase or otherwise generate torque output to the respective spool 132. During time=$t_3$ to $t_4$ the controller may cause the starter 162 to operate at a maximum torque output to oppose a change (e.g., increase) in (e.g., rotational) speed of the respective spool 132. The controller 166 may be operable to modulate starter 162 such that the starter 162 causes an increase in (e.g., rotational) speed of the respective spool 132 at time=$t_0$ to $t_1$, then substantially holds the speed of the spool 132 at time=$t_1$ to $t_2$, then causes and/or otherwise permits an increase in speed at time=$t_2$ to $t_3$, and then opposes a change (e.g., increase) in speed at time=$t_3$ to $t_4$.

The times=$t_1$ to $t_4$ may be associated with various criteria and/or thresholds, including any of the criteria and/or thresholds disclosed herein.

Figure 10:
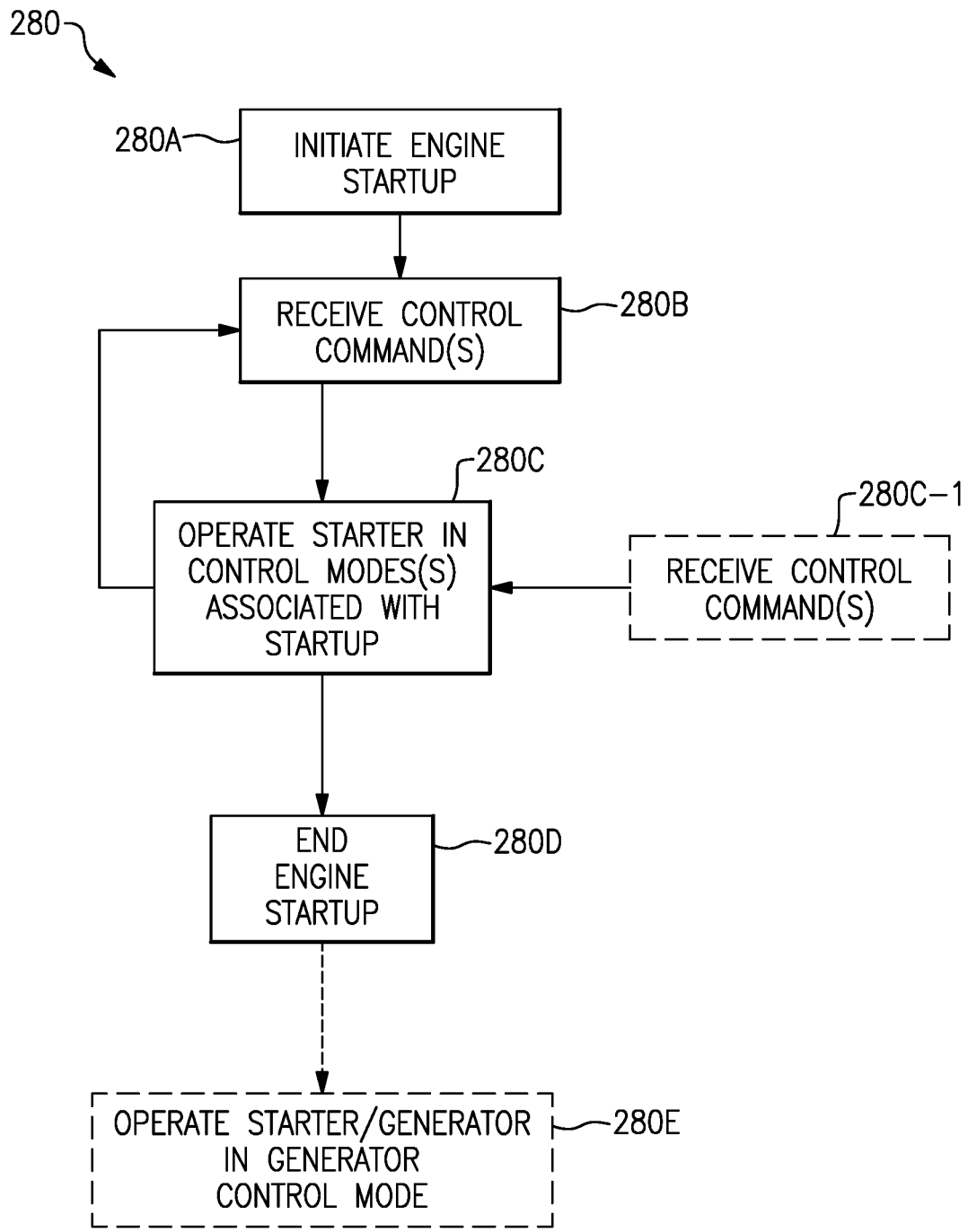
FIG. 10 discloses a process for starting a gas turbine engine.

FIG. 10 discloses a method or algorithm in a flowchart 280 for starting and/or otherwise operating a gas turbine engine, such as the engines ENG-1, ENG-2, 20, 120 of FIGS. 1-3. The method 280 may be utilized to modulate or otherwise control a starter assembly including one or more starters, such as the starter assemblies 60, 160 of FIGS. 2 and 3. The starter(s) may include any of the starters disclosed herein, such as an electric motor. Controllers 66 and 166 may be programmed or otherwise configured with logic to execute the method 280 to control the starter 62, 162. Reference is made to the starter assembly 160 for illustrative purposes.

At block 280A, an engine startup sequence for the gas turbine engine 120 may be initiated. In implementations, the startup sequence may be initiated in response to a control command, such as from the engine controller 168.

At block 280B, one or more control commands may be generated and/or received. The control command may be associated with operation of the starter 162 in a respective control mode 172. The command may be associated with one or more command signals (e.g., CS1/CS2/CS3).

At block 280C, a starter 162 may be operated in one or more control modes 172 associated with the control commands. Method 280 may include executing one or more iterations of blocks 280B and/or 280C and the associated control modes 172. Method 280 may include executing block 280C in response to receiving another control command at block 280B.

Various control modes 172 may be established, including any of the control modes disclosed herein. The control modes 172 may include a first (e.g., acceleration) control mode 172-1, a second (e.g., speed) control mode 172-2, and/or a third (e.g., torque) control mode 172-3. The control modes 172-1 to 172-3 may be associated with an engine start condition.

Block 280C may include operating the starter 162 in the acceleration control mode 172-1. The acceleration control mode 172-1 may include driving at least one spool 132 of the gas turbine engine 120 with the respective starter 162 such that rotation of the respective spool 132 may reach and then may be substantially maintained at a preselected acceleration rate to substantially achieve a target speed threshold within a preselected duration.

Block 280C may include operating the starter 162 in the speed control mode 172-2. The speed control mode 172-2 may include causing the starter 162 to substantially maintain a (e.g., rotational) speed of the respective spool 132 at a preselected holding speed. In implementations, one or more instances of operating the starter 162 in the acceleration control mode 172-1 and/or speed control mode 172-2 may occur prior to an occurrence of an engine light-off condition (e.g., event) associated with the engine 120.

Block 280C may include operating the starter 162 in the torque control mode 172-3. The torque control mode 172-3 may include causing the starter 162 to oppose a change in (e.g., rotational) speed of the respective spool 132 until a preselected engine operating threshold is met. In implementations, one or more instances of operating the starter(s) 162 of the starter assembly 160 in the torque control mode 172-3 may occur after the occurrence of the engine light-off condition, but in implementations may occur prior to an occurrence of an engine idle condition associated with the engine 120.

Block 280C may include determining one or more conditions at block 280C-1. The conditions may include any of the conditions disclosed herein, including various conditions of the starter 162, engine 120 and/or aircraft.

At block 280D the startup sequence may be ended. In implementations, the startup sequence may end in response to a control command, such as from the engine controller 168.

In implementations, the starter 162 may be a starter/generator. The control modes 172 may include a fourth (e.g., power generator) control mode 172-4. At block 280E, the starter/generator 162 may be operated in the generator control mode. Block 280E may commence subsequent to the engine start condition, such as during and/or subsequent to an engine idle condition. The starter 162 may be operable to generate an amount of electricity during various engine and flight conditions for consumption by one or more aircraft modules (e.g., components) AM.

The systems and methods disclosed herein may be utilized to improve a likelihood of a successful engine light-off event and startup. The disclosed techniques may be utilized to improve a likelihood of meeting preselected operational conditions for various components of the engine prior to reaching an idle speed and/or prior to loading the engine (e.g., full speed).

The systems and methods disclosed herein may be utilized to provide bidirectional power flow, which may provide full authority control of shaft speed and torque loading. The disclosed techniques may significantly improve engine start capability. On an aircraft with bleed systems, the disclosed starter assembly may provide shaft power back to the APU to improve transient performance during heavy loads (e.g., main engine air start, ECS cycling, etc.). The disclosed systems and methods may be incorporated into a hybrid system or range extender solution, in which the APU may operate at any speed sufficient to meet the power demand, or may cycle on and off.

It should be understood that relative positional terms such as "forward," "aft," "upper," "lower," "above," "below," and the like are with reference to the normal operational attitude of the vehicle and should not be considered otherwise limiting.

Although the different embodiments and examples have the specific components shown in the illustrations, embodiments of this disclosure are not limited to those particular combinations. It is possible to use some of the components or features from one of the embodiments and examples in combination with features or components from another one of the embodiments and examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A starter assembly for a gas turbine engine comprising:
   at least one electric motor coupled to a respective spool; and
   a controller programmed to modulate the at least one electric motor in a plurality of control modes, the control modes comprising:
      a torque control mode in which the controller is operable to set a torque output of the at least one electric motor to oppose an increase in speed of the respective spool; and
      an acceleration control mode in which the controller is operable to cause the at least one electric motor to substantially maintain acceleration of the respective spool at a preselected acceleration rate such that the respective spool substantially achieves a target speed threshold within a preselected duration;
   wherein the controller is programmed to cause the at least one electric motor to operate in the torque control mode subsequent to occurrence of an engine light-off condition until at least one predetermined criterion is met.

2. The starter assembly as recited in claim 1, wherein the controller is programmed to adjust a torque and/or a speed of the at least one electric motor to transition between the control modes.

3. The starter assembly as recited in claim 1, wherein the plurality of control modes includes a speed control mode in which the controller is programmed to cause the at least one electric motor to substantially maintain a speed of the respective spool at a preselected holding speed.

4. The starter assembly as recited in claim 3, wherein the controller is programmed to cause the at least one electric motor to operate in the acceleration control mode and then in the speed control mode prior to occurrence of the engine light-off condition.

5. The starter assembly as recited in claim 4, wherein the preselected holding speed is substantially equal to the target speed threshold for at least one iteration of the speed control mode and the acceleration control mode.

6. The starter assembly as recited in claim 1, wherein the at least one predetermined criterion includes a minimum temperature threshold of a combustor.

7. The starter assembly as recited in claim 1, wherein the controller is programmed to cause the at least one electric motor to maintain the torque output above a preselected torque threshold in the torque control mode such that the at least one electric motor opposes rotation of the respective spool until a gas turbine engine component reaches a preselected operating threshold.

8. The starter assembly as recited in claim 7, wherein the controller is programmed to cause the at least one electric motor to operate in the torque control mode in response to determining an occurrence of the engine light-off condition.

9. The starter assembly as recited in claim 1, wherein the at least one spool is a portion of an auxiliary power unit.

10. The starter assembly as recited in claim 1, wherein the at least one spool is a portion of the gas turbine engine including a propulsor having a plurality of blades that produce thrust for propulsion.

11. The starter assembly as recited in claim 1, wherein the at least one spool includes a plurality of spools, the at least one electric motor includes a plurality of electric motors coupled to the respective spools, and the controller is programmed to independently control the electric motors in the respective plurality of control modes.

12. A gas turbine engine assembly comprising:
    at least one spool including a turbine coupled to a compressor or a propulsor;
    a combustor; and
    a starter assembly including at least one electric motor operable to drive the respective spool during an engine startup condition and including a controller programmed to modulate the at least one electric motor in a plurality of control modes, the control modes comprising:
       an acceleration control mode in which the at least one electric motor substantially maintains acceleration of the respective spool at a preselected acceleration rate until a first predetermined criterion is met;
       a speed control mode in which the at least one electric motor substantially maintains a speed of the respective spool at a preselected holding speed; and
       a torque control mode in which the at least one electric motor opposes a change in speed of the respective spool until a second predetermined criterion is met, wherein the second predetermined criterion includes a minimum temperature threshold of the combustor associated with an engine idle condition.

13. The gas turbine engine assembly as recited in claim 12, further comprising an auxiliary power unit, the auxiliary power unit comprising the spool.

14. The gas turbine engine assembly as recited in claim 12, wherein:
    the controller is programmed to cause the at least one electric motor to operate in the acceleration control mode and the speed control mode prior to an engine light-off condition; and
    the controller is programmed to cause the at least one electric motor to operate in the torque control mode subsequent to the engine light-off condition, but prior to a power generator control mode in which the respective spool drives the at least one motor to generate an amount of electricity.

15. A method for starting a gas turbine engine, the gas turbine engine comprising:
    a starter assembly comprising:
       at least one electric motor coupled to a respective spool of the gas turbine engine; and
       a controller programmed to modulate the at least one electric motor in a plurality of control modes, the control modes comprising:
          a torque control mode in which the controller is operable to set a torque output of the at least one electric motor to oppose an increase in speed of the respective spool; and
          an acceleration control mode in which the controller is operable to cause the at least one electric motor to substantially maintain acceleration of the respective spool at a preselected acceleration rate such that the respective spool substantially achieves a target speed threshold within a preselected duration;
       wherein the controller is programmed to cause the at least one electric motor to operate in the torque control mode subsequent to occurrence of an engine light-off condition until at least one predetermined criterion is met;
    the method comprising:
       operating the starter assembly in the acceleration control mode, including driving the respective spool with a respective electric motor of the at least one electric motor such that rotation of the respective spool reaches and then is substantially maintained at the preselected acceleration rate to substantially achieve the target speed threshold within the preselected duration; and operating the starter assembly in the torque control mode, subsequent to occurrence of the engine light-off condition, in which the respective electric motor opposes a change in rotational speed of the respective spool until a preselected engine operating threshold is met.

16. The method as recited in claim 15, further comprising: operating the starter assembly in a speed control mode in which the respective electric motor substantially maintains the rotational speed of the respective spool at a preselected holding speed.

17. The method as recited in claim 15, wherein:
an instance of operating the starter assembly in the acceleration control mode occurs prior to an occurrence of the engine light-off condition; and
an instance of operating the starter assembly in the torque control mode occurs after the occurrence of the engine light-off condition but prior to an occurrence of an engine idle condition.

\* \* \* \* \*